Figure 1:
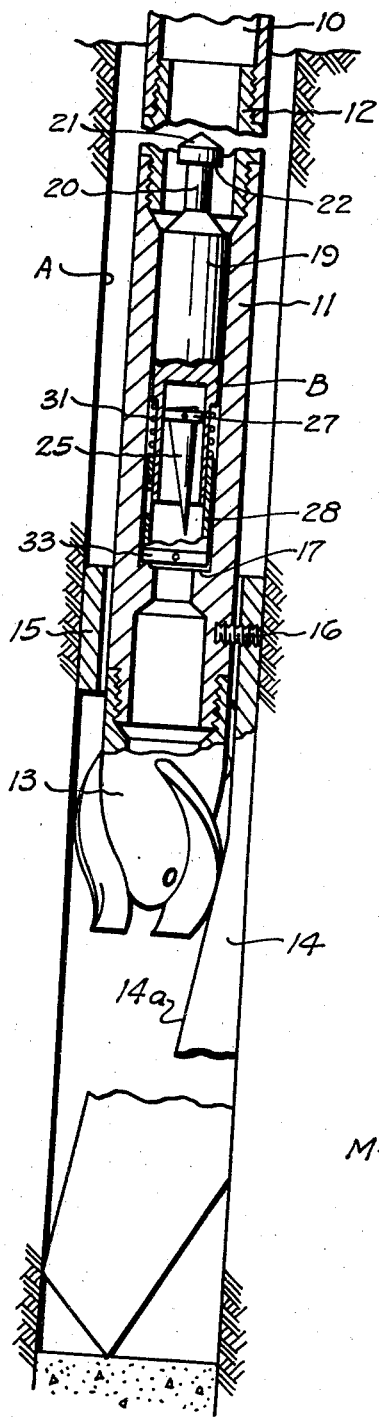

May 13, 1947.  C. H. SCHADEL  2,420,447
ORIENTING APPARATUS
Original Filed Nov. 23, 1942

Charles H. Schadel
INVENTOR

BY *Jo. E. Edwards*
ATTORNEY

Patented May 13, 1947

2,420,447

UNITED STATES PATENT OFFICE 2,420,447

ORIENTING APPARATUS

Charles H. Schadel, Houston, Tex., assignor of one-half to Eastman Oil Well Survey Company, Dallas, Tex., a corporation of Delaware, and one-half to Eastman Oil Well Survey Corporation, Long Beach, Calif., a corporation of California Original application November 23, 1942, Serial No. 466,708. Divided and this application August 28, 1944, Serial No. 551,568

2 Claims. (Cl. 255—1.6)

This invention relates to new and useful improvements in orienting apparatus.

This application is filed as a division of my copending application, Serial No. 466,708, filed November 23, 1942, now Patent No. 2,405,717, issued February 15, 1946.

One object of the invention is to provide an improved and exceptionally simple apparatus for orienting a well tool or device, such as a whipstock within a well bore, whereby said tool may be located in a predetermined or desired position in said bore.

An important object of the invention is to provide an improved orienting apparatus which employs a soft impression disk or record, said disk being adapted to receive a double marking or indication; one of said indications being representative of the position of the well tool to be oriented and the other of said indications being representative of the position of the low side of the well bore, whereby the exact location or direction of said tool may be ascertained.

Another object of the invention is to provide an improved orienting apparatus, of the character described, including an indicating instrument comprising telescoping sections, one of which carries the impression disk and the other of which has a marking plumb bob secured thereto, whereby when the sections are telescoped toward each other the plumb bob marks the disk to indicate the position of the low side of the well bore.

A further object of the invention is to provide an orienting apparatus having a marking element, which is representative of the position of the tool to be oriented, disposed within the drill pipe and also having an instrument provided with an impression disk, said disk forming the lower end of the instrument whereby the bottom of the disk is engageable with and adapted to be marked by the marking element within the drill stem, while the upper surface of said disk is arranged to be marked by the gravity actuated marking means within said instrument; the arrangement providing for dual marking of the single disk whereby interpretation of the indications is facilitated.

The construction designed to carry out the invention will be hereinafter described together with other features of the invention.

Figure 2:
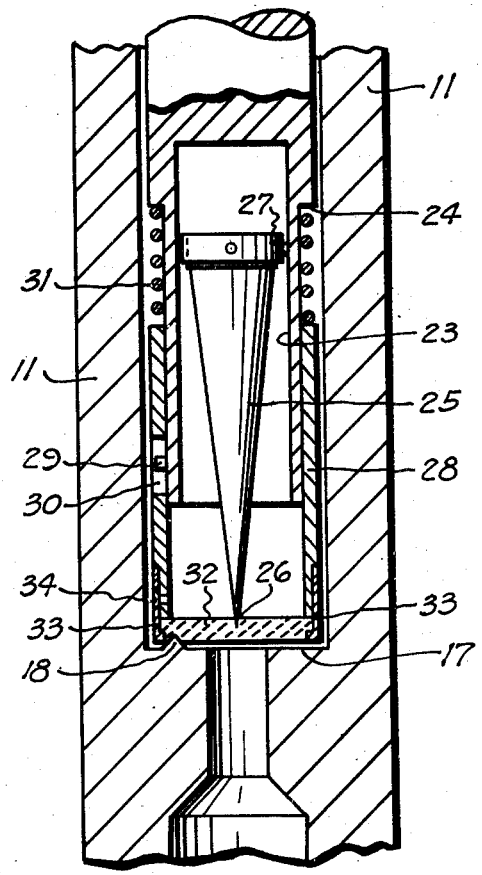
Figures 3, 4:
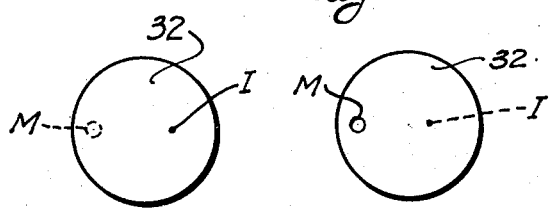

The invention will be more readily understood from a reading of the following specification and by reference to the accompanying drawing, wherein an example of the invention is shown, and wherein:

Figure 1 is a view, partly in section and partly in elevation of an orienting apparatus constructed in accordance with the invention and showing the apparatus mounted within a drill pipe, Figure 2 is an enlarged, transverse, vertical, sectional view of the instrument and illustrating the parts in their marking position, Figure 3 is a plan view of the impression disk after marking, and Figure 4 is a bottom view of said disk.

In carrying out the present invention, it is first necessary to make a directional survey of the bore hole at the point at which the tool is to be set so as to determine the direction of inclination of the hole at such point. This may be done by any suitable instrument either a gyroscopic or a magnetic instrument and such instrument may be lowered into the well bore on a wire line or cable for the purpose of making the initial survey. An instrument, which is generally known to the trade as a single shot surveying instrument may be employed. By means of the instrument, the degree of inclination or deviation from the vertical, as well as the direction of such inclination may be determined. For example, the instrument may show that the bore hole inclines N. 75 E., or it may show any other reading in accordance with the inclination and direction of the well bore.

After this inclination is obtained by the initial directional survey of the well bore A by any suitable instrument, the drill stem or pipe 10 (Figure 1) is lowered into said well bore. An elongate cylindrical sub 11 is coupled to the lower end of the drill stem or pipe by means of a suitable coupling collar or tool joint 12. A drill bit 13 is screw-threaded onto the lower end of the sub 11, the bit being illustrated as a drag bit although it may be of any suitable type. With this arrangement, it will be obvious that the sub 11 is interposed between the lower end of the drill stem or pipe 10 and the drill bit 13. A whipstock 14, or other well device to be oriented, is adapted to be connected to the sub and includes a collar 15 which is preferably made integral with its upper end. The collar encircles the lower portion of the sub 11, being secured to said sub by means of a shear pin 16. It is noted that the shear pin is preferably located in vertical alignment with the angular face 14a of the whipstock. When the drill stem or pipe 10 is lowered through the well bore A, it will be obvious that the whipstock, as well as the drill bit, are lowered therewith. A rotation of the drill stem or pipe will impart a rotation to the whipstock whereby said whipstock will be oriented in the hole in the desired manner so that the whipstock face 14a will be directed in a predetermined direction. After the shear pin 16 has been broken, the drill bit 13, sub 11 and drill pipe 10 may be moved downwardly through the collar 15 of the whipstock and upon such movement, the bit 13 is guided by the angular face of said whipstock. It is noted that this construction, above described, is general practice and forms no part of the present invention.

Manifestly, when the drill pipe having the whipstock attached thereto is lowered through the well bore A and finally reaches the position at which said whipstock is to be set, the direction or position in which the face 14a of said whipstock is directed is not known. In order to continue drilling in the desired direction it is first necessary to determine the location of the whipstock face and to then orient the whipstock into the desired position. For determining the position or location of the whipstock face 14a an instrument B is arranged to be mounted within the bore of the sub 11. The instrument is supported within the bore of the sub upon an annular shoulder 17 (Figure 2). The shoulder 17 is formed with a projection or lug 18 which has a pointed upper end. The lug is located in a predetermined or known position with respect to the face 14a of the whipstock which is attached to the sub 11. As illustrated, the lug 18 is disposed 180 degrees opposite the shear pin 16 and is therefore representative of the direction in which the inclined surface 14a of the whipstock faces.

The instrument B comprises an upper section 19 which has a fishing neck or shank 20 preferably made integral with its upper end. A head 21 at the upper end of the shank is enlarged with respect to the shank whereby an annular shoulder 22 is formed. The upper portion of the section 19 is solid in cross-section while the lower portion is tubular as illustrated at 23. The tubular portion 23 has its outer surface reduced in diameter whereby an external shoulder 24 is formed on the exterior of the section 19. A plumb bob 25 having a lower pointed or marking end 26 is mounted within the tubular portion 23 of the upper section, said plumb bob being supported by the usual gimbal ring suspension 27. The lower end of the plumb bob projects below the lower end of the section 19 and is obviously free to swing to the low side of the well bore when the instrument is disposed within an inclined well bore.

A lower tubular section 28 engages over the tubular portion 23 of the upper section and is slidable thereon. The sections are connected together by a pin 29 on the upper section engaging within a longitudinal slot 30 in the lower section. The upper section 19 is constantly urged upwardly with respect to the lower section by a coil spring 31 which surrounds the section 19 and which is confined between the external shoulder 24 and the upper edge of the section 28. The spring normally holds the parts in a position with the upper edge of the slot 30 engaging the pin 29 of the section 19.

An impression plate or disk 32 closes the lower end of the lower section 28 and is maintained in position by a retaining ring 33 which is secured to the section 28 by removable retaining screws 34. This disk is adapted to engage the marking lug 18 of the supporting shoulder 17, such engagement occurring when the instrument is inserted into the sub 11. The upper surface of the disk 32 is normally spaced from the lower pointed end of the plumb bob 25; however, when the upper section 19 of the instrument is moved downwardly with respect to the lower section, the plumb bob 25 is moved into engagement with the disk 32, whereby the upper surface of said disk is marked to indicate the low side of the well bore.

The operation of the device is obvious. The instrument B is preferably inserted within the sub prior to lowering of the drill stem into the well bore. Upon insertion, the impression disk 32 of said instrument is engaged with the lug 18 of the supporting shoulder 17, whereby said lug forms an indentation or mark M in the lower surface of the disk. As explained, the lug bears a known angular relation to the direction in which the whipstock face is disposed and thus the mark M on the disk is representative of the position or location of said whipstock face. The drill stem is then lowered through the well bore until it reaches the position at which it is to be set.

The parts are permitted to remain at rest for a sufficient length of time to allow the plumb bob 25 to fall to the low side of the well bore. A suitable jarring device is then lowered through the drill stem and a downward jar is imposed upon the head 21 at the upper end of the instrument. Such downward jar will cause the upper section to be moved downwardly with respect to the lower section, such downward movement being permitted by compression of the coil spring 27. As the upper section further telescopes the lower section the pointed end of the plumb bob engages the upper surface of the disk 32 to form a mark or indication I, such indication being representative of the low side of the well bore.

The instrument is then removed from the well by means of a suitable fishing tool (not shown) which is engaged with the shoulder 22 of the head 21, after which the disk 32 is removed from said instrument. The removal of the disk is accomplished by removing the retaining screws 34 which hold a retaining ring 33 in place. By noting the position of the marks I and M on opposite sides of the disk and by determining the angular relationship of one to the other it is possible to definitely ascertain the position of the whipstock face. The preliminary survey which is made prior to lowering of the orienting apparatus has advised the operator of the direction in which the well bore is inclining at the elevation of setting of the whipstock. It is, of course, known that the indication I which represents the low side of the well bore is 180 degrees opposite the direction of inclination of the bore and thus the actual direction of the indication I is known to the operator. By determining the angular difference between the location of the mark M and the indication I the true direction in which the whipstock is facing may be determined. After this determination, the drill pipe may be rotated to properly orient the whipstock in the desired direction.

The device is simple in construction and comprises a minimum number of parts. The single disk receives both indications or marks whereby a single record having a double marking is produced. Since the lug 18 is fixed in a known position with respect to the whipstock face there is no chance of misalignment of this lug. Although it is desirable to lower the instrument with the drill stem it would be possible to first run the drill stem and then lower the instrument by means of a fishing tool which tool is ordinarily used for removing said instrument after the record is made. The plumb bob may be made sufficiently heavy to assure an accurate indication of inclination and also to assure definite marking of the upper surface of the disk.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An orienting apparatus for a deflecting tool to be oriented including, a drill pipe, a deflecting tool connected to the lower end of said pipe, an inclination indicating instrument adapted to be removably supported in the drill pipe, said instrument comprising an upper tubular section, a lower tubular section telescoping the upper section, an impression record element closing the lower end of the lower section, marking means responsive to gravity mounted in the upper section and normally spaced from said record element and arranged to move into engagement therewith to mark the element to indicate the low side of the well bore when the sections are further telescoped toward each other, the sections being moved toward each other to perform the marking operation by the imposition of a downward jar on the upper end of the instrument, and a marking projection within the drill stem for engaging and marking the underside of the record element, said projection supporting said instrument within the drill pipe and being representative of the position or direction of the deflecting tool, whereby said mark may be correlated with the mark on the upper surface of the element to locate the azimuthal position of said tool.

2. An orienting apparatus for a deflecting tool to be oriented including, a drill pipe, a deflecting tool connected to the lower end of said drill pipe, an inclination indicating instrument adapted to be removably supported in the drill pipe, said instrument comprising an upper tubular section, a lower tubular section telescoping the upper section, an impression record element closing the lower end of the lower section, marking means responsive to gravity mounted in the upper section and normally spaced from said record element and arranged to move into contact therewith to mark the element to indicate the low side of the well bore when the sections are further telescoped toward each other, and marking means within the drill pipe for engaging and marking the underside of the record element when the instrument is supported within the drill pipe, said marking means within the drill pipe bearing a known angular relationship to the deflecting tool.

CHARLES H. SCHADEL.

REFERENCES CITED

The following references are of record in the file of this patent:

UNITED STATES PATENTS

| Number | Name | Date |
|---|---|---|
| 2,173,745 | Hoard | Sept. 19, 1939 |
| 1,895,615 | Elliott | Jan. 31, 1933 |
| 1,918,448 | Box | July 18, 1933 |
| 1,903,512 | McLaughlin | Apr. 11, 1933 |
| 2,109,853 | Straatman | Mar. 1, 1938 |
| 2,246,417 | Smith | June 17, 1941 |
| 1,981,665 | Rieber | Nov. 20, 1934 |
| 2,100,418 | Welikanov | Nov. 30, 1937 |
| 2,282,431 | Smith | May 12, 1942 |
| 2,301,307 | McMahan | Nov. 10, 1942 |